United States Patent [19]

Kohsaka et al.

[11] Patent Number: 5,043,554

[45] Date of Patent: Aug. 27, 1991

[54] PLASMA-ARC CUTTING APPARATUS HAVING MEANS FOR DEFLECTING PLASMA ARC

[75] Inventors: Kunio Kohsaka, Nagoya; Osamu Yamada, Aichi; Hisaaki Yamane, Kasugai, all of Japan

[73] Assignee: Brother Kogyo Kabushiki Kaisha, Aichi, Japan

[21] Appl. No.: 495,701

[22] Filed: Mar. 19, 1990

[30] Foreign Application Priority Data

Mar. 23, 1989 [JP] Japan .................................. 1-71043
May 31, 1989 [JP] Japan .................................. 1-139830

[51] Int. Cl.$^5$ .............................................. B23K 9/00
[52] U.S. Cl. .............................. 219/121.39; 219/123; 219/121.54; 219/121.56; 219/121.48; 219/124.1
[58] Field of Search .................. 219/121.39, 121.44, 219/121.48, 121.52, 74, 75, 123, 130.4, 124.03, 121.54–121.56, 124.1

[56] References Cited

U.S. PATENT DOCUMENTS 4,740,668 4/1988 Perez ............................. 219/121.39

FOREIGN PATENT DOCUMENTS

| 49-13062 | 3/1974 | Japan . | |
|---|---|---|---|
| 52-16459 | 5/1977 | Japan . | |
| 0007352 | 2/1980 | Japan | 219/123 |
| 55-8271 | 3/1980 | Japan . | |
| 0045575 | 3/1980 | Japan | 219/123 |
| 0110467 | 6/1984 | Japan | 219/123 |
| 2154028 | 8/1985 | Japan | 219/123 |
| 1186272 | 7/1989 | Japan | 219/121.44 |

Primary Examiner—M. H. Paschall
Attorney, Agent, or Firm—Oliff & Berridge

[57] ABSTRACT

A plasma-arc cutting apparatus having a plasma torch producing a plasma arc and cutting a workpiece with the plasma arc, the plasma torch including a nozzle from whcih the plasma arc is ejected toward the workpiece; a feed device moving the plasma torch relative to the workpiece; a magnetic-field forming device producing a magnetic filed, and applying the magnetic field to the plasma arc so as to intersect the plasma arc and thereby deflect the arc; a first control device numerically controlling the feed device according to cutting operation information, the cutting operation information including cutting path data representative of a predetermined curved cutting path along which the plasma torch is moved over the workpiece, the first control means providing torch position data representative of a current position of the plasma torch relative to the workpiece; and a second control device controlling the magnetic-field forming device according to the cutting operation information and the torch position data so that the plasma arc is deflected to an optimum direction with respect to a direction of movement from the current position of the plasma torch as the plasma torch is moved along the curved cutting path.

13 Claims, 10 Drawing Sheets

FIG. 6A PLASMA-ARC CURRENT (A)

FIG. 6B CUTTING SPEED (m/min)

FIG. 6C COIL CURRENT (A)

PLASMA-ARC CUTTING APPARATUS HAVING MEANS FOR DEFLECTING PLASMA ARC

BACKGROUND OF THE INVENTION

1. Field of the Invention

The present invention generally relates to a plasma-arc cutting apparatus and more particularly to such an apparatus capable of deflecting a plasma arc by utilizing a magnetic field.

2. Related Art Statement

There is known a plasma-arc cutting apparatus having a plasma torch for ejecting a plasma arc toward local portions of a metallic or non-metallic workpiece in the form of, for example, a plate, and cutting the workpiece by fusing or melting the local portions thereof.

However, a desired part cut from a workpiece by a plasma-arc cutting apparatus adapted to apply a plasma arc normally to the workpiece, suffers from a comparatively large bevel of the cut surface thereof with respect to the upper or lower surface of the workpiece (or desired part), because the upper portion of the workpiece is more melted than the lower portion. In other words, the cut surface of the desired part is not made normal to the upper or lower surface thereof. Thus, additional work steps are needed for finishing the cut surface, namely, processing the cut part so as to have a cut surface normal to the upper or lower surface thereof (hereinafter, this surface being referred to as the "normal" cut surface).

In the above-indicated situation there is known the technique of deflecting a plasma arc ejected from a plasma torch, by applying a magnetic field thereto. Japanese Patent Application laid open under Publication No. 49-13062 (1974) discloses the method of applying a magnetic field to a plasma arc ejected from a plasma torch, and thereby deflecting the plasma arc toward a desired part to be cut out of a workpiece, so that the desired part has a normal cut surface.

The plasma-arc cutting technique taught by Japanese Patent Application No. 49-13062 can provide a part having a normal cut surface in the event that the part is cut from a workpiece as the plasma torch is moved in a pre-selected cutting direction at a constant cutting speed. Since the direction of deflection of the plasma arc is not changed during the cutting operation, however, the known cutting technique cannot provide a part having a normal cut surface over an entire length thereof in the event that the part is cut in various directions different from the above-indicated pre-selected cutting direction, for example at a curved portion or a sharp corner of the part, or in the event that the part is cut at different cutting speeds during the cutting operation.

SUMMARY OF THE INVENTION

It is therefore an object of the present invention to provide a plasma-arc cutting apparatus which is capable of cutting a desired part out of a workpiece such that the desired part cut out of the workpiece has a normal cut surface over an entire length thereof.

The above object has been achieved by the present invention, which provides a plasma-arc cutting apparatus comprising (a) a plasma torch producing a plasma arc and cutting a workpiece with the plasma arc, the plasma torch including a nozzle from which the plasma arc is ejected toward the workpiece, (b) feed means for moving the plasma torch relative to the workpiece, (c) magnetic-field means for producing a magnetic filed, and applying the magnetic field to the plasma arc so as to intersect the plasma arc and thereby deflect the plasma arc, (d) first control means for numerically controlling the feed means according to cutting operation information, the cutting operation information including cutting path data representative of a predetermined curved cutting path along which the plasma torch is moved over the workpiece, the first control means providing torch position data representative of a current position of the plasma torch relative to the workpiece, and (e) second control means for controlling the magnetic-field means according to the cutting operation information and the torch position data so that the plasma arc is deflected to an optimum direction with respect to a direction of movement from the current position of the plasma torch as the plasma torch is moved along the curved cutting path.

In the plasma-arc cutting apparatus constructed as described above, the first control means numerically controls the feed means according to the cutting operation information, so that the plasma torch is moved relative to the workpiece. Concurrently the magnetic-field means produces a magnetic filed, and applies the magnetic field to the plasma arc ejected from the nozzle of the plasma torch. Thus, the plasma arc is deflected, and a plasma-arc cutting operation is carried out with the plasma arc being deflected. Upon commencement of the plasma-arc cutting operation the second control means controls the magnetic-field means according to the cutting operation information and the torch position data so that the plasma arc is always deflected to an optimum direction with respect to a direction of movement of the plasma torch from the current position thereof along the predetermined cutting path while the plasma torch is moved along the cutting path. Thus, the present apparatus can assure that a desired part cut from a workpiece thereby has a normal cut surface over an entire length thereof, namely, that the cut surface of a desired part is normal to the upper or lower surface of the desired part over an entire length of the cut surface.

In the present plasma-arc cutting apparatus, the direction of deflection of the plasma arc ejected from the plasma torch is always adjusted to an optimum direction with respect to a direction of the movement of the plasma torch from a current position thereof along the predetermined curved cutting path, preferably toward the cut surface of a desired part to be cut out of the workpiece. Thus, the present apparatus is capable of providing a part having a normal cut surface over an entire length thereof even in the event that the contour of the desired part includes a sharp corner or a curved portion.

In an advantageous embodiment of the present invention, the magnetic-field means is rotatable about a center line of the nozzle of the plasma torch, the second control means including rotating means for rotating the magnetic-field means about the center line of the nozzle according to the cutting operation information and the torch position data. In a preferred form of this embodiment, the plasma torch is rotatable about the center line of the nozzle and the magnetic-field means is fixed to the plasma torch, the rotating means of the second control means rotating the magnetic-field means by rotating the plasma torch. In another form of the same embodiment, the plasma torch is not rotatable about the center line of the nozzle, and the magnetic-field means is supported by the plasma torch such that the magnetic-field means is rotatable about the center line of the nozzle, the rotating means of the second control means rotating the magnetic-field means relative to the plasma torch.

In another embodiment of the present invention, the magnetic-field means comprises a plurality of magnetic-field generators producing respective magnetic fields intersecting each other, the second control means controlling at least strengths of the magnetic fields. In a preferred form of this embodiment, the second control means further controls directions of the magnetic fields. The magnetic field produced by each of the magnetic-field generators is represented by a magnetic-field vector having a direction and a magnitude thereof, and a composite magnetic-field vector results from all the magnetic-field vectors. The direction of the composite magnetic-field vector can be adjusted to all 360° directions about a center line of the nozzle of the plasma torch from which the plasma arc is ejected. The second control means controls the direction and magnitude of the magnetic field produced from each of the magnetic-field generators so that the plasma arc is always deflected to an optimum direction with respect to a direction of movement of the plasma torch from a current position thereof while the plasma torch is moved along the predetermined cutting path. In other words, the direction of the composite magnetic-field vector is always adjusted to an optimum direction based on a direction of movement of the plasma torch from a current position thereof. The thus constructed magnetic-field means is not required to be rotatable about the center line of the nozzle, and therefore rotating means for rotating the magnetic-field means is not necessary. Furthermore, it is possible to simplify the construction of a connection device for connecting a gas supply, a coolant supply, etc. to the plasma torch. In the event that the second control means is adapted to control the magnitudes of the magnetic fields produced by the magnetic-field generators but is not adapted to control the directions of the magnetic fields, the composite magnetic-field vector can be adjusted to a desired direction within a limited range of angle about the center line of the nozzle.

According to a feature of the above embodiment of the present invention, the magnetic-field means comprises two magnetic-field generators producing respective magnetic fields perpendicularly intersecting each other, the magnetic-field generators applying the magnetic fields to the plasma arc such that each of the magnetic fields perpendicularly intersects the plasma arc.

In yet another embodiment of the present invention, the magnetic-field means comprises a magnetic-path member having a curved configuration, and a pair of end portions opposed to each other between which the plasma arc passes, and an exciting coil wound around the magnetic-path member, the exciting coil magnetizing the magnetic-path member and thereby producing the magnetic field between the pair of end portions.

In a preferred form of the above embodiment, the magnetic-path member includes a pair of arms and a connection portion connecting respective base portions of the arms to each other, the exciting coil being wound around the connection portion. In another form of the same embodiment, the magnetic-path member includes two linear portions whose respective one ends are opposed to each other in a direction perpendicular to a center line of the nozzle, and a connection portion extending along an arc whose center is located on the center line of the nozzle, the connecting portion connecting the respective other ends of the linear portions to each other which ends are remote from the nozzle, the exciting coil comprising two coils wound around the corresponding linear portions in a same direction of winding. In yet another form of the same embodiment, the nozzle is formed of a non-magnetic material, the non-magnetic nozzle being disposed between the opposed end portions of the magnetic-path member, the magnetic-field means applying the magnetic field to the plasma arc before the plasma arc is ejected from the non-magnetic nozzle. In a further form of the same embodiment, the plasma-arc cutting apparatus further comprises third control means for controlling a magnitude of a plasma-arc current applied to the plasma torch, depending upon at least one of a material and a thickness of the workpiece, the second control means including excitation control means for controlling a magnitude of a coil current applied to the exciting coil depending upon the at least one of the material and the thickness of the workpiece. The excitation control means may comprise a table representative of a predetermined relationship between magnitude of coil current and the at least one of the material and the thickness of the workpiece, and controls the magnitude of the coil current according to the table.

In a further embodiment of the present invention, the plasma-arc cutting apparatus further comprises select means for selectively designating, in the event that the workpiece is cut along a closed cutting path, a clockwise and a counterclockwise direction in which direction said plasma torch is moved along the closed cutting path for cutting the workpiece, the cutting operation information including cutting direction data representative of the designated clockwise or counterclockwise direction.

BRIEF DESCRIPTION OF THE DRAWINGS

The above and optional objects, features and advantages of the present invention will be better understood from reading the following detailed description of the presently preferred embodiment of the invention when considered in conjunction with the accompanying drawings, in which.

DETAILED DESCRIPTION OF THE PREFERRED EMBODIMENTS

Figure 1:
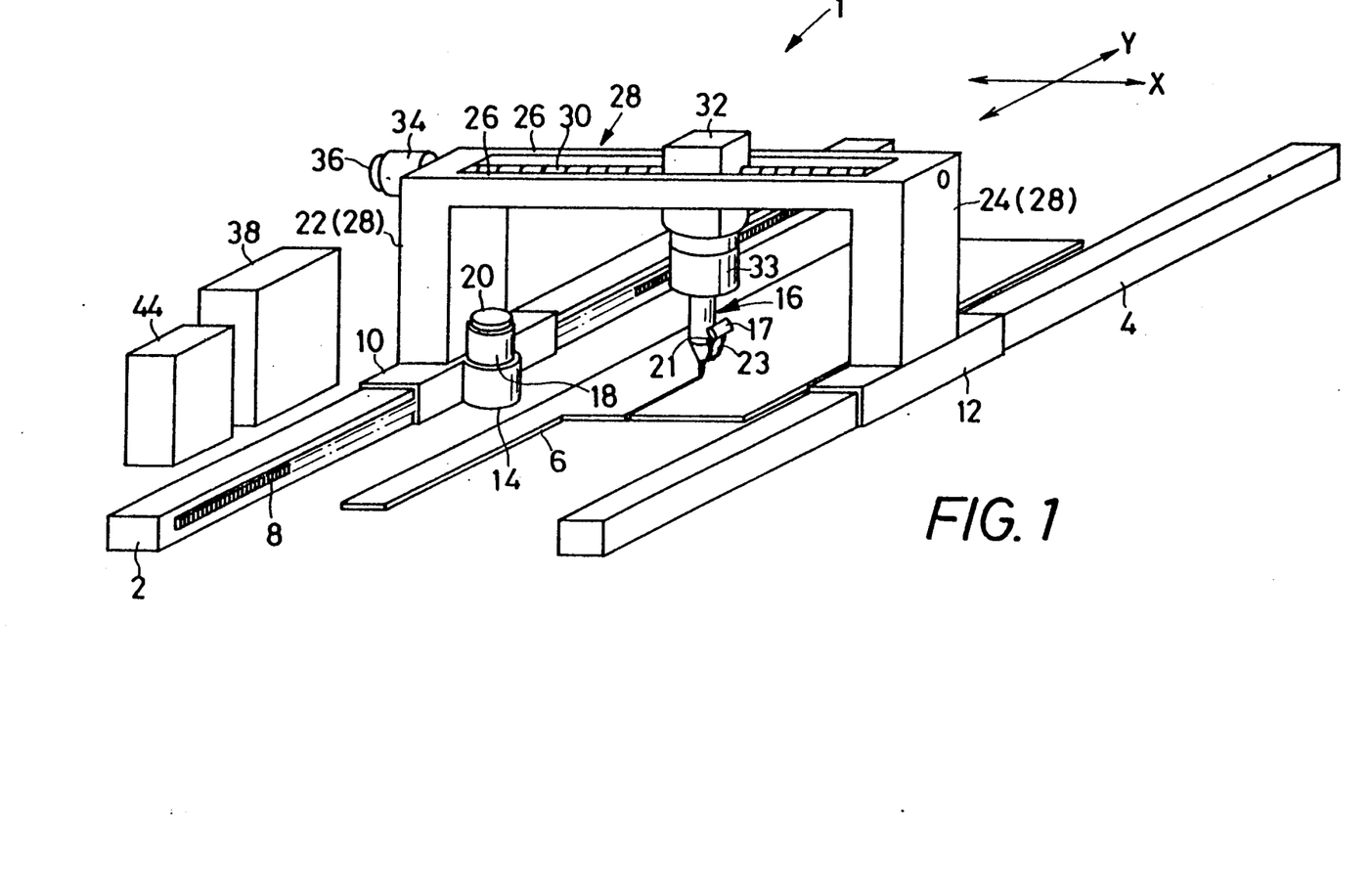
FIG. 1 is a perspective view of a plasma-arc cutting apparatus of the present invention.

Referring first to FIG. 1 there is illustrated a plasma-arc cutting apparatus 1 embodying the present invention. The apparatus 1 is capable of numerically controlling movements of a plasma torch 16 for cutting a workpiece 6 in the form of, for example, a plate.

The cutting apparatus 1 includes a pair of guide rails 2, 4 disposed on a bed (not shown). The guide rails 2, 4 are spaced apart a predetermined distance from each other and extend parallel to each other. Each of the guide rails 2, 4 has a rectangular cross section. A rack 8 is secured to an inner side surface of the left-hand guide rail 2 such that the rack 8 extends over substantially the entire length of the inner side surface. The workpiece 6 to be cut is placed between the pair of guide rails 2, 4.

A torch holder 28 having a gate-like configuration rests on the pair of guide rails 2, 4 such that the torch holder 28 is movable in a direction indicated at Y in FIG. 1. The torch holder 28 includes a first and a second base portion 10, 12, a first and a second column 22, 24, and a front and a rear support portions 26, 26. The first base portion 10 has a suitable length as measured in the direction Y, and a generally gate-like cross section, and movably rests on the left-hand guide rail 2. The second base portion 12 has a configuration similar to that of the first base portion 10, and movably rests on the right-hand guide rail 4. The first and second columns 22, 24 vertically stand on the first and second base portions 10, 12, respectively. The support portions 26, 26 horizontally bridge the upper ends of the first and second columns 22, 24 such that the support portions 26, 26 are spaced apart a predetermined distance from each other in the direction Y and extend parallel to each other in a direction X perpendicular to the direction Y.

The first base portion 10 has on an inner side surface thereof a protrusion 14 in which a Y-direction servo motor 18 is accommodated. The Y servo motor 18 serves for moving the first base portion 10 (or the torch holder 28) in the direction Y. More specifically described, a pinion (not shown) is provided on an output shaft of the Y servo motor 18 such that the pinion engages the rack 8. Reference numeral 20 denotes a first encoder associated with the Y servo motor 18. The first encoder 20 generates a feed back signal YS (see FIG. 5) indicative of a current position of the plasma torch 16 as viewed in the direction Y. When the Y servo motor 18 is driven, the first base portion 10 is moved on the left-hand guide rail 2 due to the threaded engagement between the pinion associated with the motor 18 and the rack 8, and simultaneously the second base portion 12 is moved on the right-hand guide rail 4, so that the torch holder 28 (or the plasma torch 16) is moved in the direction Y.

Figure 2:
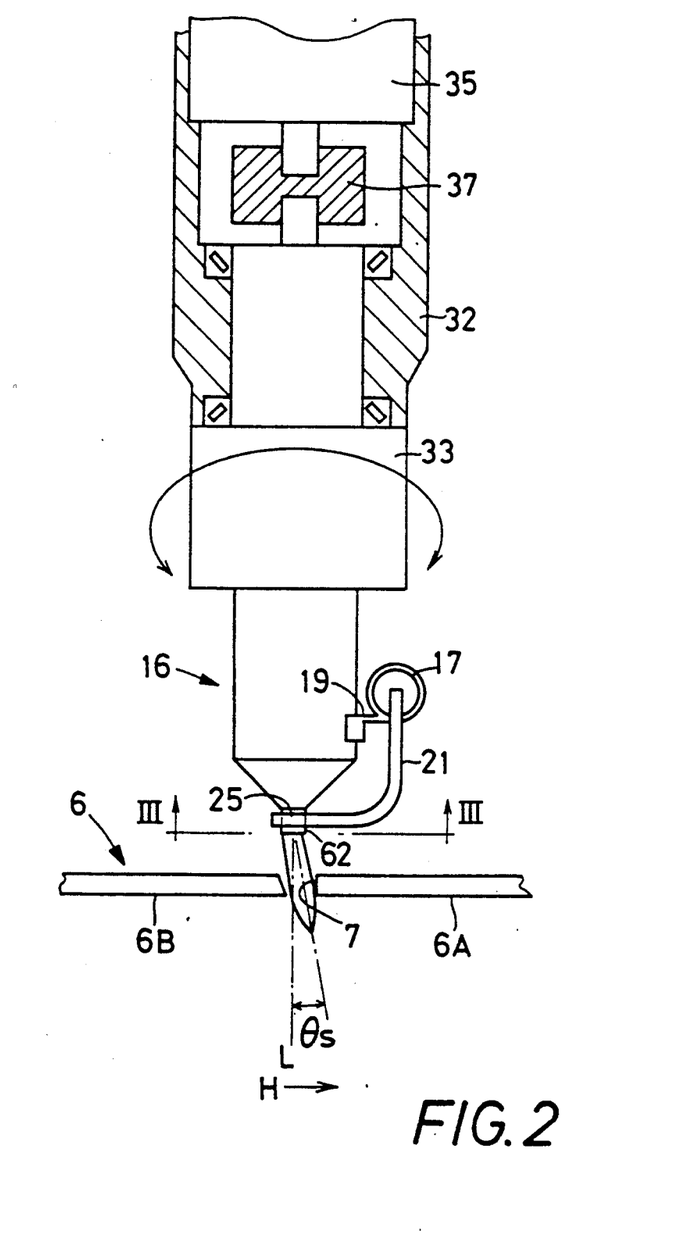
FIG. 2 is an elevational view of a plasma torch and a magnetic-field generator of the apparatus of FIG. 1, with a part removed.

A recirculating ball-type threaded shaft 30 horizontally bridges the upper ends of the first and second columns 22, 24 of the torch holder 28. The threaded shaft 30 extends in the direction X, and is rotatably supported at axial ends thereof by the upper ends of the columns 22, 24. A support member 32 threadedly engages the threaded shaft 30 via a recirculating ball-type threaded nut (not shown) accommodated in the support member 32. The support member 32 has on one of a front and a rear side surface thereof a slider (not shown) engaging a guide portion (not shown) formed in a corresponding one of the support portions 26, 26, and the slider is guided by the guide portion in the direction X. A mount member 33 having a circular cross section is rotatably secured to a lower end of the support member 32. The plasma torch 16 is fixedly secured to a lower end of the mount member 33. The mount member 33 is rotated about a center line of the plasma torch 16 by a step motor 35 (see FIG. 2). As shown in FIG. 2, the step motor 35 is coupled to the mount member 33 via a coupling 37.

The threaded shaft 30 is at a left-hand end thereof connected to an output shaft of a X-direction servo motor 34, which serves for moving the plasma torch 16 in the direction X. Reference numeral 36 denotes a second encoder associated with the X servo motor 34. The second encoder 36 generates a feed back signal XS (see FIG. 5) indicative of a current position of the plasma torch 16 as viewed in the direction X. When the X servo motor 34 is driven, the threaded shaft 30 is driven and the support member 32 is moved due to the recirculating ball-type engagement between the threaded shaft 30 and the support member 32, so that the plasma torch 16 is moved in the direction X. Thus, the Y and X servo motors 18, 34 cooperate with each other to feed the plasma torch 16 to any cutting point over the workpiece 6.

Figure 3:
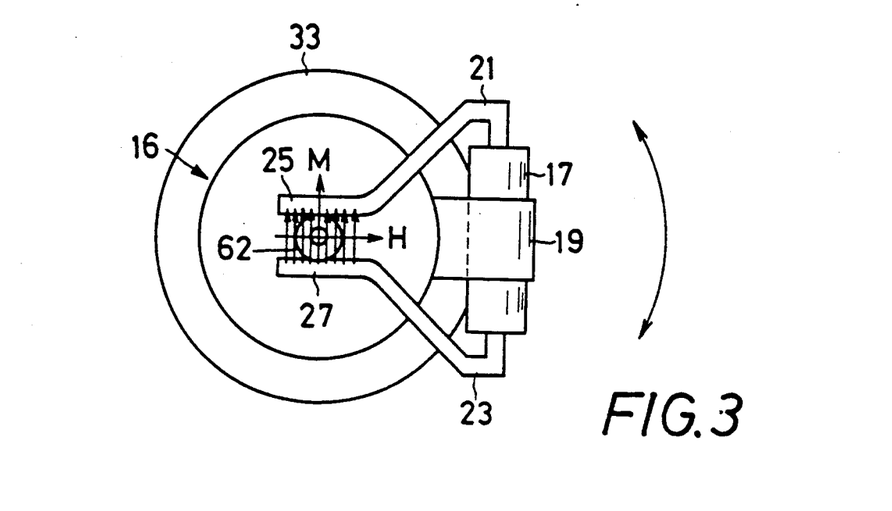
FIG. 3 is a view taken along lines III—III of FIG. 2.

As shown in FIGS. 2 and 3, a magnetic-field generator 17 including an exciting coil (not shown) is secured to the plasma torch 16 with the help of a fixture 19 such that the magnetic-field generator 17 horizontally extends. A magnetic-path member 21, 23 formed of a magnetic steel and having a rectangular cross section, extends through the exciting coil of the generator 17. The magnetic-path member has an integral curved configuration which includes a pair of arms 21, 23 and a connection portion integrally connecting respective base portions of the arms 21, 23 to each other. The exciting coil of the generator 17 is wound around the connection portion of th magnetic-path member. The arms 21, 23 have respective end portions, i.e. first and second operative portions 25, 27 which horizontally are opposed to each other and extend parallel to each other. A nozzle 62 extends downward from a lower end of the plasma torch 16 such that the nozzle 62 passes between the first and second operative portions 25, 27 of the magnetic-path member. When a voltage is applied to the magnetic-field generator 17 so as to flow an electric current through the exciting coil of the generator 17 in an appropriate direction, the first operative portion 25 acts as the south (S) pole while the second operative portion 27 acts as the north (N) pole. The magnetic-field generator 17 is rotated about a center line of the nozzle (i.e., the vertical axis) when the mount member 33 is rotated by the step motor 35.

The present cutting apparatus further includes a control box 38 which accommodates a control device 40 (described later), a plasma-arc power source 42 for supplying the plasma torch 16 with a plasma-arc current, and a control panel 44 (described below).

Figure 4:
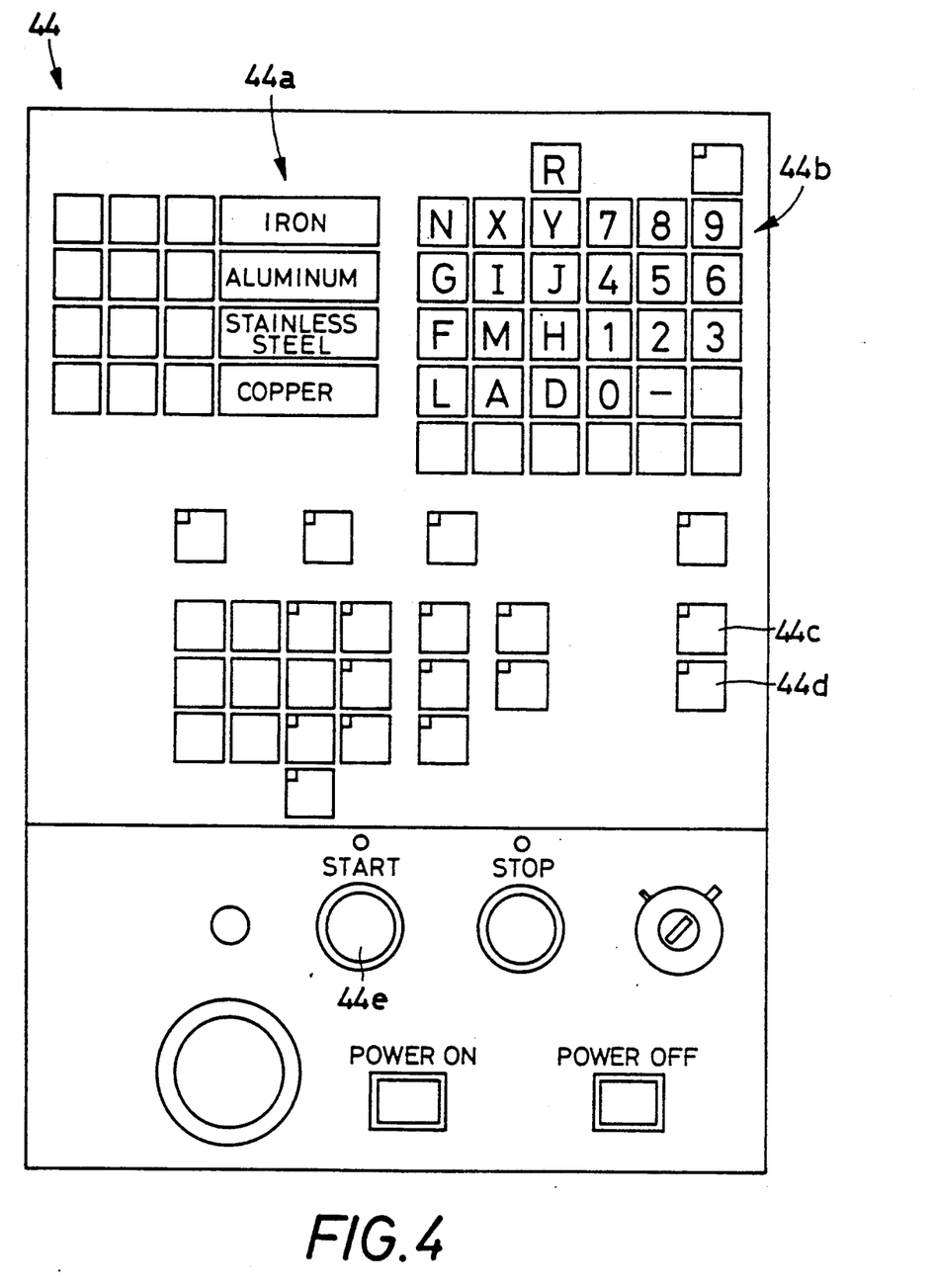
FIG. 4 is a view of a control panel of the apparatus of FIG. 1.

As shown in FIG. 4 the control panel 44 includes a plurality of workpiece-material select keys 44a for inputting in the control device 40 data representative of material of the workpiece 6 to be cut; a plurality of character and numeral keys 44b for inputting data representative of a curved cutting path along which the plasma torch 16 is moved for cutting the workpiece 6, and for inputting data representative of a thickness of the workpiece 6; a normal-direction and a reverse-direction key 44c, 44d for selectively designating a clockwise and a counterclockwise direction in which direction the plasma torch 16 is moved along a closed curved path for cutting the workpiece; and a start switch 44e for starting plasma-arc cutting operation for cutting the workpiece 6.

The present plasma-arc cutting apparatus 1 has a gas supply (not shown) for supplying an operative gas to the plasma torch 16 for producing a plasma gas stream, and a coolant supply (not shown) for feeding a coolant to the nozzle 62 of the plasma torch 16 and thereby cooling the nozzle 62. The present cutting apparatus further has cables for supplying drive currents to the servo and step motors 18, 34, 35, cables for supplying an electric current and a control signal to the magnetic-field generator 17, a hose for conducting the operative gas from the gas supply to the plasma torch 16, and a hose for conducting the coolant from the coolant supply to the nozzle 62. These cables and hoses are adapted to permit the plasma torch 16 to move relative to the workpiece 6.

Figure 5:
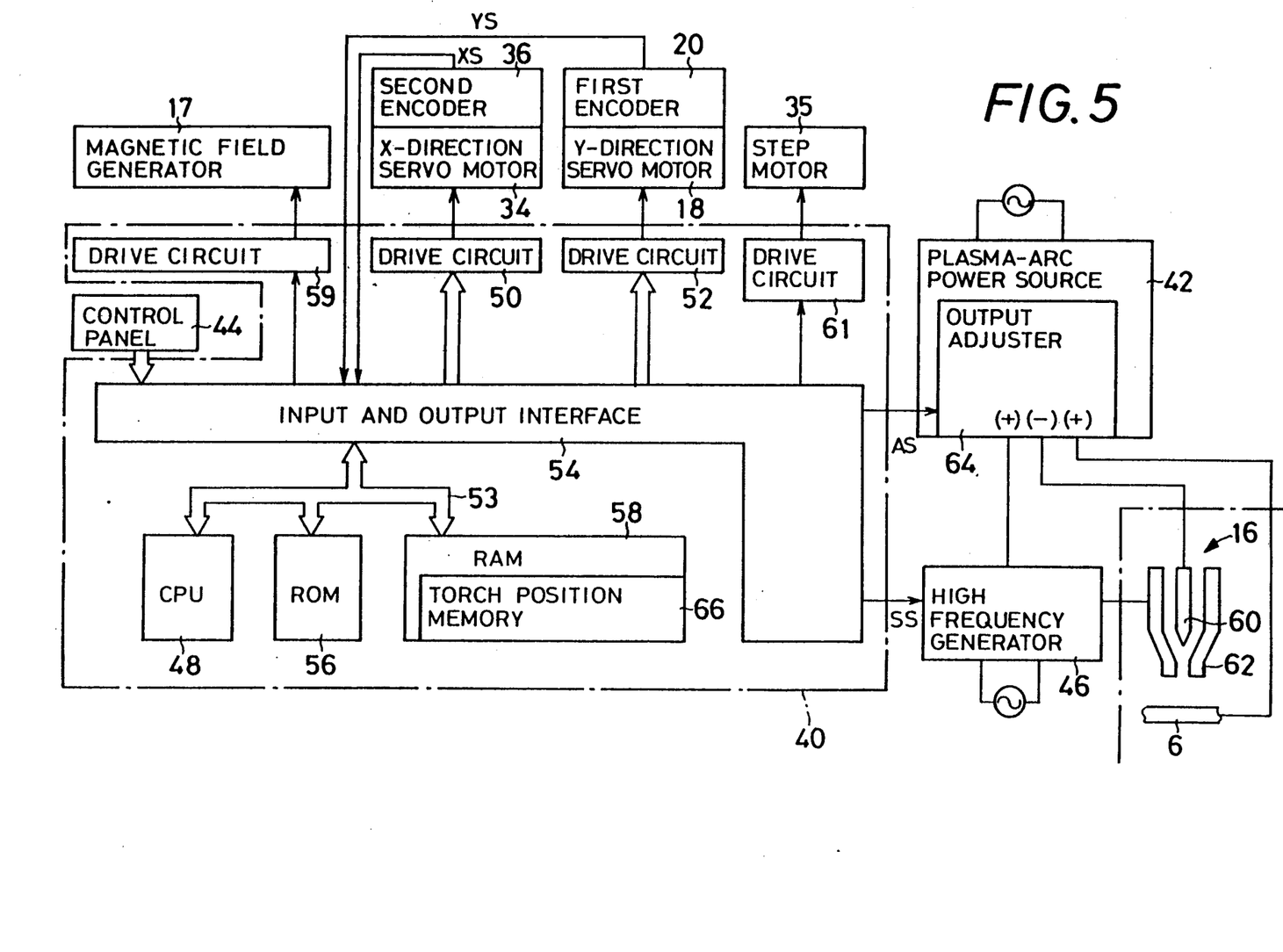
FIG. 5 is a diagrammatic view of a control system of the apparatus of FIG. 1.

Referring next to the diagrammatic view of FIG. 5 there is illustrated the control system of the plasma-arc cutting apparatus 1. The control system is essentially constituted by the control panel 44, the X servo motor 34, the Y servo motor 18, the plasma-arc power supply 42, a high-frequency generator 46, and the control device 40. The control device 40 includes a central processing unit (CPU) 48 and drive circuits 50, 52, 59, 61, and further includes an input/output (I/O) interface 54, a read only memory (ROM) 56, and a random access memory (RAM) 58 which are connected to the CPU 48 via bus 53 including data bus.

The I/O interface 54 is connected to the control panel 44 and the drive circuits 50, 52, 59, 61. To the interface 54 the feed back signals XS, YS are supplied from the second and first encoders 36, 20, respectively. The plasma-arc power supply 42 utilizes a commercial alternating current, and applies a direct-current plasma-arc current between an electrode 60 of the plasma torch 16 and the workpiece 6. The power supply 42 has an output adjuster 64 for adjusting, according to an adjust signal AS supplied thereto from the CPU 48 via the interface 54, the plasma-arc current to be supplied to the torch electrode 60. The positive terminal (+) of the output adjuster 42 is connected to the workpiece 6, while the negative terminal (−) of the same 42 is connected to the torch electrode 60.

When a plasma arc is ejected from the nozzle 62 of the plasma torch 16, a plasma current flows through the plasma arc from the workpiece 6 toward the torch electrode 60. If concurrently the first operative portion 25 is magnetized to the S pole and the second operative portion 27 is magnetized to the N pole as shown in FIGS. 2 and 3, a magnetic field directed from the N pole to the S pole is produced between the first and second operative positions 25, 27 and influences the plasma arc passing between the operative portions 25, 27. In other words, a Lorentz force acts on the plasma arc so that the plasma arc is deflected to a direction H by an angle $\theta s$ with respect to the vertical axis L as measured in a vertical plane perpendicular to a direction M of the magnetic field. The direction H corresponds to a left-hand direction for a man facing in the direction M, namely, the first operative portion 25. In FIG. 2 reference 6A denotes a desired part to be cut out of the workpiece 6 by the present apparatus, while reference 6B denotes a scrap part to be discarded.

The high-frequency generator 46 serves for generating a pilot arc between the torch electrode 60 and the nozzle 62 prior to commencement of a plasma-arc cutting operation. To this end the high-frequency generator 46 continues to apply a high-frequency voltage to the nozzle 62 for a certain duration of time in which the generator 46 is supplied with a start signal SS from the CPU 48 via the I/O interface 54.

Figure 6A:
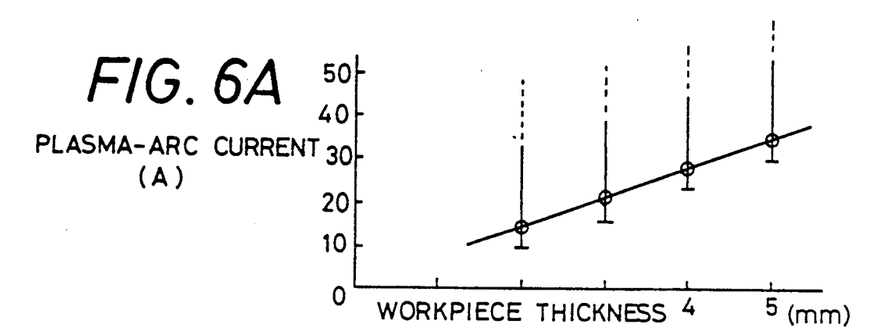
FIGS. 6A, 6B and 6C show three tables respectively representative of respective predetermined relationships between workpiece thickness and plasma-arc current, cutting speed or coil current, all used for a workpiece of iron.
Figure 6B:
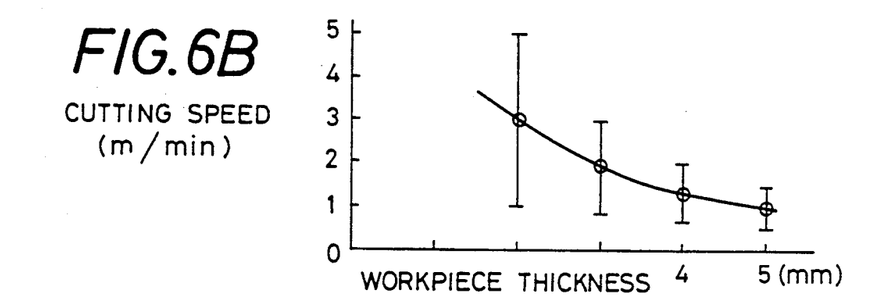
Figure 6C:
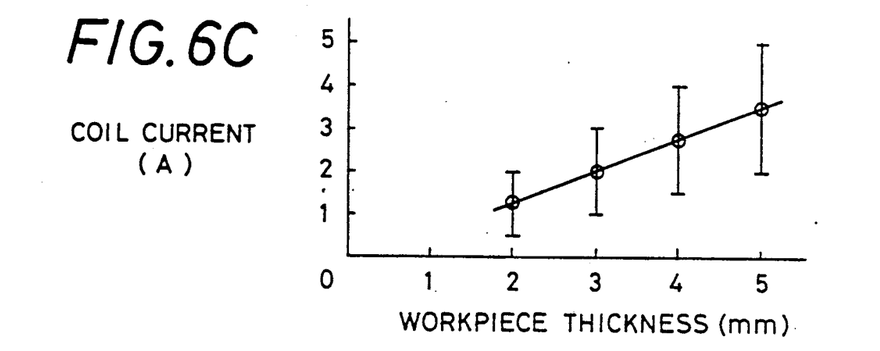

The following data and programs are pre-stored in the ROM 56:

(1) various interpolation programs for calculating, based on the data stored in the RAM 58 representative of the predetermined curved cutting path, an amount of rotation of each of the X and Y servo motors 34, 18 required for moving the plasma torch 16, at intervals of minute times;

(2) numerical control programs for numerically controlling the X and Y servo motors 34, 18 according to the rotation amounts obtained by using the above-indicated interpolation programs and the data representative of a current position of the plasma torch 16 which data are supplied from the second and first encoders 36, 20 in the form of the feed back signals XS, YS;

(3) deflection control programs for controlling the direction of deflection of the plasma arc produced by the plasma torch 16 so that the desired part 6A has a normal cut surface 7 with respect to the upper or lower surface of the workpiece 6 over an entire length of the cut surface, the deflection control programs belonging to the above-indicated numerical control programs; and (4) a first table representative of a predetermined relationship between plasma-arc current and workpiece thickness, a second table representative of a predetermined relationship between cutting speed and workpiece thickness, and a third table representative of a predetermined relationship between coil current and workpiece thickness (the magnitude of the magnetic field produced by the magnetic-field generator 17 being adjusted by controlling the magnitude of coil current applied to the generator 17), as shown in FIG. 6, these three tables being used for iron, similar tables being pre-stored in the ROM 56 for each of the other workpiece materials (in the present embodiment, aluminum, stainless steel and copper, see FIG. 4), the symbols o in the tables of FIG. 6 being indicative of data stored in the ROM 56.

The above-indicated three tables used for each workpiece material are experimentally or empirically determined so that a stable plasma arc is produced between the torch electrode 60 and a workpiece 6 and so that the desired part 6A is cut with a high quality, normal cut surface 7.

The RAM 58 temporarily stores the data representative of various cutting paths for various cutting operations which data are inputted through the control panel 44, and the data representative of the material and thickness of the workpiece 6 specified and designated through the control panel 44. The RAM 58 includes a torch position memory 66 for temporarily storing the data representative of a current position of the plasma torch 16 during a plasma-arc cutting operation, and various memories for temporarily storing various data resulting from execution of the various control programs by the CPU 48.

Figure 7:
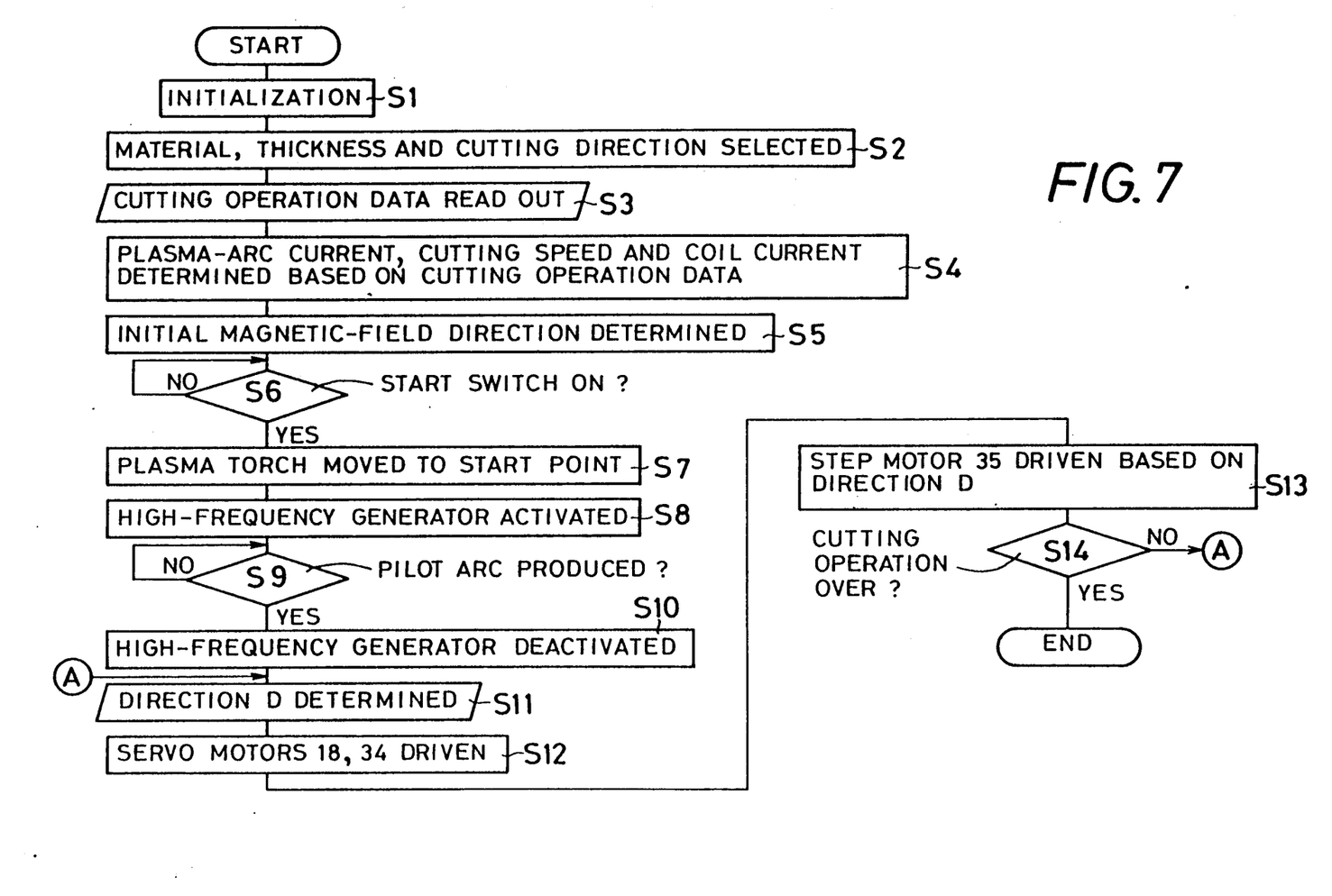
FIG. 7 is a flow chart according to which the apparatus of FIG. 1 carries out plasma-arc cutting operation for cutting a workpiece.

Referring next to the flow chart of FIG. 7, there will be described the numerical control operation of the control device 40, specifically operation for controlling the direction of deflection of the plasma arc produced by the plasma torch 16.

Figures 8, 9:
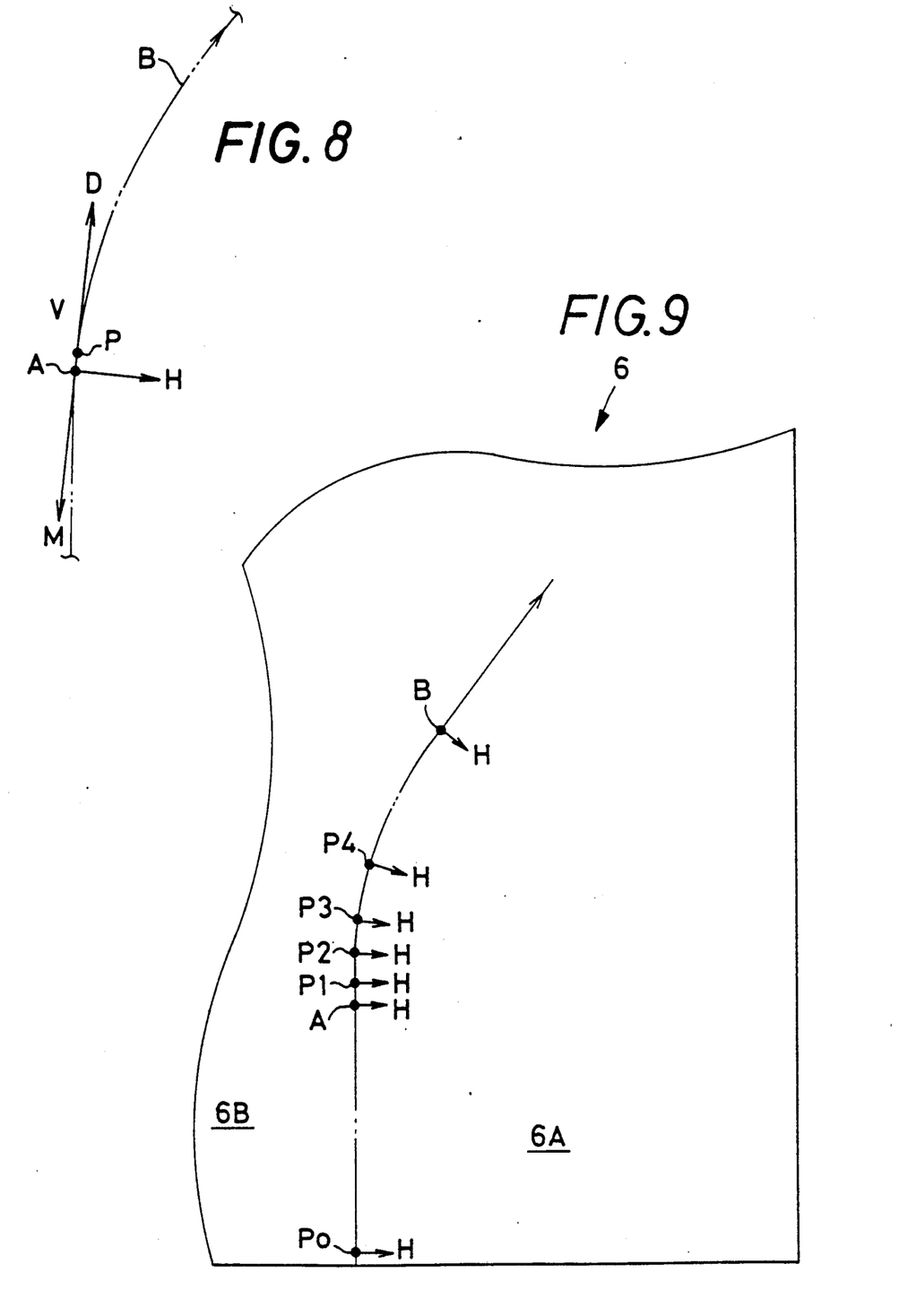
FIGS. 8 and 9 are illustrative views showing a direction of deflection of a plasma arc produced from the plasma torch, with respect to a direction of movement of the plasma torch from each of respective points on a predetermined cutting path.

Upon application of electric power to the present plasma-arc cutting apparatus, the control of the CPU 48 begins with Step S1 in which initialization operations are executed. Step S1 is followed by Step S2 in which data representative of the material and thickness of the workpiece 6 in the form of a plate to be cut are inputted through operations of the workpiece-material select keys 44a and the numeral keys 44b. In the event that the predetermined cutting path whose data have been stored in the ROM 56 consists of a closed curved path, the clockwise or counterclockwise direction in which the plasma torch 16 is moved along the closed cutting path is designated by operation of the normal-direction or reverse-direction key 44c, 44d in Step S2. In the following Step S3 the CPU 48 reads out from the ROM 56 cutting operation data representative of a plasma-arc current I, a cutting speed V and a coil current according to the three tables corresponding to the specified workpiece material and the data representative of the designated workpiece thickness. Step S3 is followed by Step S4 in which the CPU 48 supplies an adjust signal AS to the output adjuster 64 according to the determined plasma-arc current, controls the drive circuits 50, 52 connected to the X and Y servo motors 34, 18 according to the determined cutting speed, and controls the drive circuit 59 connected to the magnetic-field generator 17 according to the determined coil current. Thus, a plasma-arc current (cutting current) is applied between the torch electrode 60 and the workpiece 6 (see FIG. 5). Subsequently in Step S5 the magnetic-field generator 17 (or the mount member 33) is initialized or rotated by the step motor 35 so that a plasma arc produced by the plasma torch 16 be deflected to an appropriate direction with respect to a direction of movement of the plasma torch 16 from a start point along the predetermined cutting path. For example, in the event that the plasma torch 16 is moved clockwise (i.e., in the normal direction) along the predetermined cutting path, the magnetic-field generator 17 is initialized so that the direction M of the magnetic-field produced by the generator 17 is opposite to a direction D of movement from the start position of the plasma torch 16, as shown in FIG. 8. Meanwhile, in the event that the plasma torch 16 is moved counterclockwise (i.e., in the reverse direction), the magnetic-field generator 17 is initialized so that the direction M and the direction D become the same direction.

In the following Step S6 it is judged whether or not the cutting operation start switch 44e has been operated with the plasma torch 16 being supplied with an operative gas from the gas supply. If the judgement in Step S6 is affirmative (YES), the control of the CPU 48 proceeds with Step S7 in which the X and Y servo motors 34, 18 are driven based on the cutting path data stored in the RAM 58 so that the plasma torch 16 is moved to the start point Po (see FIG. 9) of the cutting path. Data representative of the start point Po where the plasma torch 16 currently is located, is temporarily stored in the torch position memory 66 of the RAM 58.

Prior to commencement of a plasma-arc cutting operation, in Step S8 the CPU 48 supplies a start signal SS to the high-frequency generator 46 so as to apply a high-frequency voltage between the torch electrode 60 and the nozzle 62 and thereby produce a pilot arc therebetween. In the following step S9 it is judged from the output adjuster 64 whether or not the pilot arc has been produced between the torch electrode 60 and the nozzle 62. If the judgement in Step S9 is affirmative, the control proceeds with Step S10 in which the CPU 48 commands the high-frequency generator 46 to ceasing from applying the high-frequency voltage. The gas injected into the pilot arc is ionized forming a plasma gas stream, and the thus formed plasma gas steam is ejected from the nozzle toward the workpiece 6. Thus, a plasma arc as a main arc is produced between the torch electrode 60 and the workpiece 6, and a plasma-arc cutting operation is started for cutting the workpiece 6 along the predetermined cutting path.

Subsequently, in Step S11 the CPU 48 reads out the cutting path data, which also represents the contour of the desired part 6A to be cut, and calculates according to the interpolation programs a certain intermediate point on the cutting path which point is spaced apart a minute distance from a current position of the plasma torch 16. The CPU 48 determines the direction of a straight line connecting between the current position of the plasma torch 16 and the above-indicated intermediate point, as an approximate to a direction D of movement of the plasma torch 16 from the current position thereof along the predetermined cutting path. Step S11 is followed by Step S12 in which the X and Y servo motors 34, 18 are driven and the torch position data stored in the memory 66 is updated. In the following Step S13 the step motor 35 is driven based on the torch movement direction D so that the direction M of the magnetic field is deflected to an optimum direction with respect to the torch movement direction D. In step S14 it is judged whether or not the numerical control operation has ended. If the judgement in Step S14 is negative (NO), Steps S11 through S14 are repeated. Meanwhile, if the judgement in Step S14 turns affirmative, the control operation is terminated.

For example, in the event that, as shown in FIG. 8, the plasma torch 16 is moved clockwise along an arc AB as a part of the predetermined cutting path, the CPU 48 reads data representative of a start and an end point A, B, a radius, and a center point of the arc AB, which data are included in the cutting path data stored in the RAM 58, and determines an actual arcuate path AB along which the plasma torch 16 is moved. If the plasma torch 16 currently is located at the start point A of the path AB, the CPU 48 determines a direction D of movement from the start point A of the plasma torch 16 based on the start point A and a certain intermediate point P. In the present embodiment, the CPU 48 controls the drive amount of the step motor 35 so that the direction M of the magnetic field produced by the magnetic-field generator 17 is opposite to the torch movement direction D. As a result, the direction H of deflection of the plasma arc corresponds to a right-hand direction as viewed in the direction D. Thus, the cut surface 7 of the desired part 6A facing the cut surface of the scrap part 6B is generally uniformly fused or melted over an entire area from the upper edge thereof to the lower edge thereof, so that the cut surface 7 becomes normal to the upper and/or lower surfaces of the desired part 6A.

As the plasma torch 16 is moved along the predetermined cutting path via points Pi (i=1, 2, 3, ...) shown in FIG. 9, the deflection direction H of the plasma arc is always adjusted to the right-hand direction with respect to the movement direction D of the plasma torch 16, so that the cut surface 7 becomes normal to the upper and/or lower surfaces of the desired part 6A. Even in the event that the cutting path includes a straight line, or a more complex curved portion than the arcuate path AB, the step motor 35 is similarly controlled so that the plasma-arc deflection direction H is always directed to the right-hand direction as viewed in the torch movement direction D. In other words, the desired part 6A cut out of the workpiece 6 has a normal cut surface over the entire length thereof including the above-indicated straight or curved portion.

In the present embodiment, the direction of a tangential line with respect to a current position of the plasma torch 16 on the predetermined cutting path may be used as a direction D of movement from a current position of the plasma torch 16. In this case, the CPU 48 is adapted to determine the tangential line based o the data representative of the predetermined cutting path and the data representative of the current position of the plasma torch 16.

Figure 10:
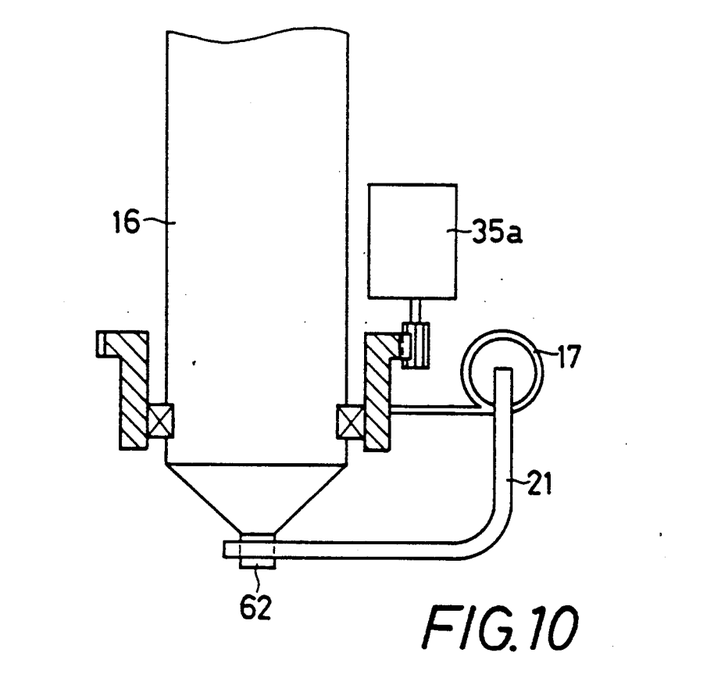
FIG. 10 is a view corresponding to FIG. 2, showing a modified form of the apparatus of FIG. 1.

As shown in FIG. 10, the magnetic-field generator 17 may be supported by a stationary plasma torch 16a such that the generator 17 is rotated about the center line of a nozzle 62 by a step motor 35a. The stationary plasma torch 16 is not rotatable about the center line of the nozzle 62.

Moreover, the deflection of the plasma arc to the direction H may be achieved by flowing a coil current in a reverse direction through the exciting coil of the magnetic-field generator 17 so as to magnetize the first and second operative portions 25, 27 to the N and S poles, respectively, and simultaneously rotating the generator 17 by 180 degrees.

While in the present embodiment a constant plasma-arc current is used for cutting out the desired part 6A though the predetermined cutting path (or the contour of the part 6A) includes straight and curved portions, it is possible to change the magnitude of the plasma-arc current depending upon the shapes of local portions of the cutting path. In this case the coil current applied to the magnetic-field generator 17 may also be changed in accordance with the changed plasma-arc current because Lorentz force is proportional to the electric current magnitude and the magnetic field strength. For example, in the event that the magnitude of the plasma-arc current is reduced for cutting a curved portion whose curvature is comparatively large, it is recommended that the magnitude of the coil current be reduced in accordance with the reduced magnitude of the plasma-arc current.

Figure 11:
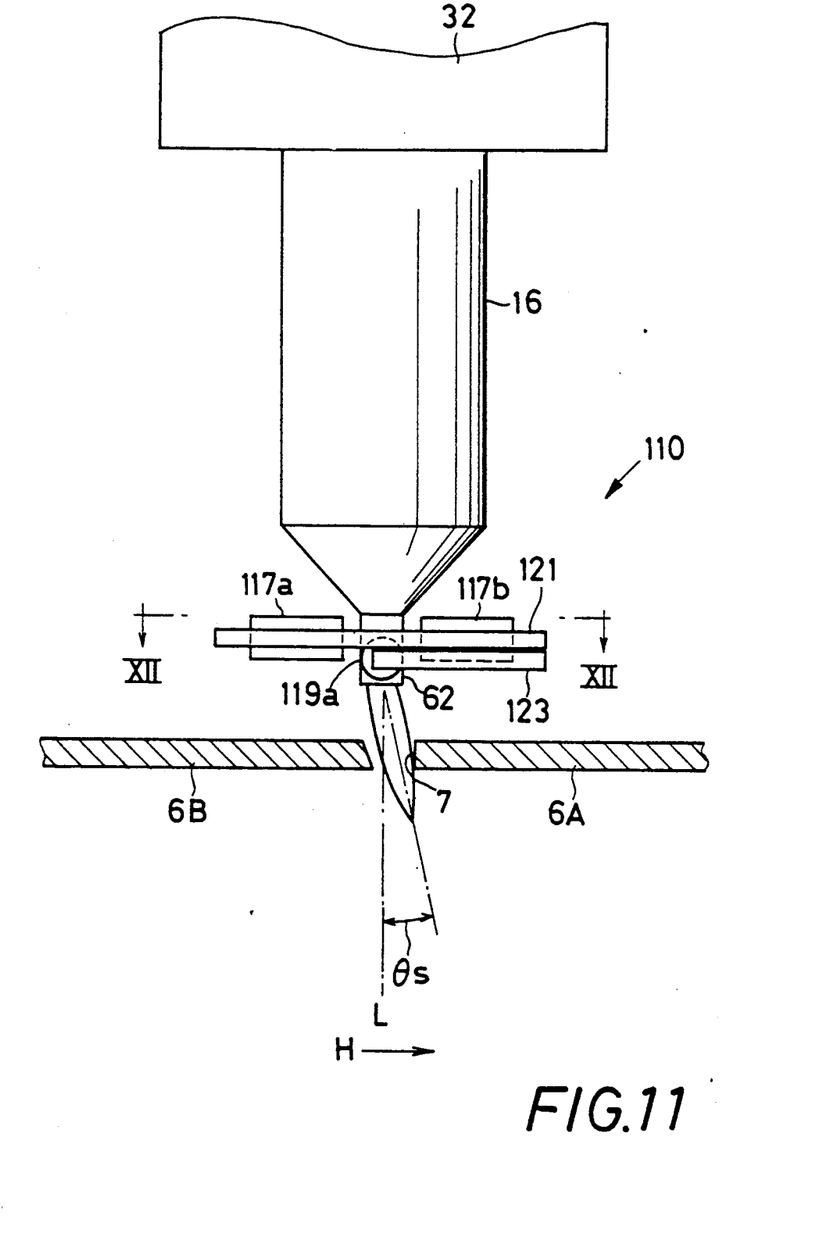
FIG. 11 is a view corresponding to FIG. 2, showing another embodiment of the apparatus of FIG. 1 including a first and a second magnetic-field generator.
Figure 12:
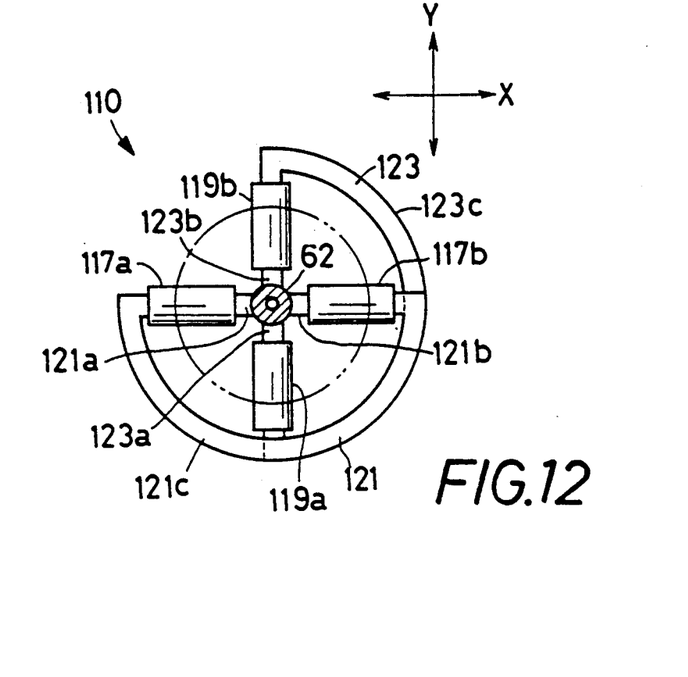
FIG. 12 is a view taken along lines XII—XII of FIG. 11.
Figure 13:
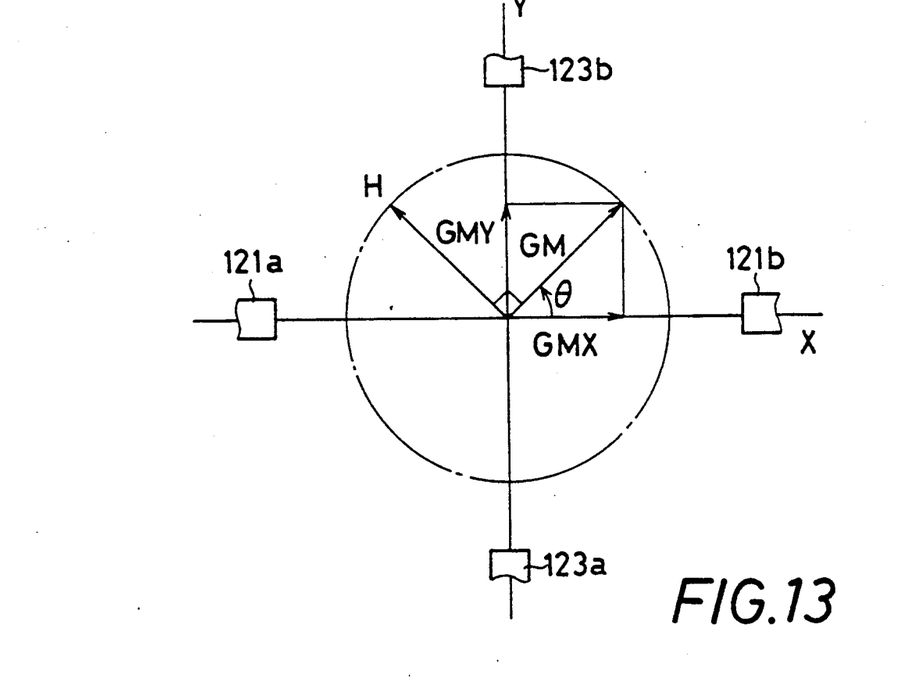
FIG. 13 is a graph showing a composite magnetic-field vector GM resulting from respective magnetic-field vectors GMX, GMY produced by the first and second magnetic-field generators.

Referring next to FIGS. 11-13 there will be described another embodiment of the plasma-arc cutting apparatus of the present invention.

The instant embodiment is different from the preceding embodiment in that the instant embodiment does not have the rotatable mount member 33 and the step motor 35 (and the drive circuit 61) used in the preceding embodiment and employs a magnetic-field generating device 110 in place of the counterpart 17 used in the preceding embodiment. The same reference numerals as used in the preceding embodiment are used to designate the corresponding members or parts of the instant embodiment.

As clearly shown in FIG. 12 the magnetic-field generating device 110 of the instant embodiment includes a first and a second magnetic-path member 121, 123. The first magnetic-path member 121 includes two linear portions 121a, 121b whose respective one ends are opposed to each other in a direction X perpendicular to a center line of a nozzle 62 secured to the lower end of a plasma torch 16, and an arcuate connection portion 121c extending along an arc whose center is located on the center line of the nozzle 62. The connection portion 121c connects the respective other ends of the linear portions 121a, 121b to each other which ends are remote from the nozzle 62. The second magnetic-path member 123 includes two linear portions 123a, 123b extending in a direction Y normal to the direction Y and an arcuate connection portion 123c all of which are similar to the counterparts 121a, 121b, 123c of the first magnetic-path member 121. The second magnetic-path member 123 is disposed beneath the first magnetic-path member 121 such that the second member 123 is angularly displaced from the first member 121 by 90 degrees in the counterclockwise direction with respect to the center line of the nozzle 62 as seen in FIG. 12. The first and second magnetic-path members 121, 123 each have a laminated structure of silicon steel plates. The magnetic-field generating device 110 further includes a pair of first exciting coils 117a, 117b wound around the corresponding linear portions 121a, 121b, and a pair of second exciting coils 119a, 119b wound around the corresponding linear portions 123a, 123b. Each pair of exciting coils 117a and 117b or 119a and 119b are wound in a same direction of winding, and connected to each other in series. The opposed end portions of the linear portions 121a and 121b or 123a and 123b of each of the first and second magnetic-path member 121, 123, are fixed to the nozzle 62. Thus, the magnetic-field generating device 110 is fixedly supported by the plasma torch 16. The nozzle 62 is formed of a non-magnetic material such as copper, and permits a magnetic field to pass therethrough without exerting any influence to the magnetic field.

Thus, the first magnetic-path member 121 and the first exciting coils 117a, 117b cooperate with each other to serve as a first magnetic-field generator 117, while the second magnetic-path member 123 and the second exciting coils 119a, 110b cooperate with each other to serve as a second magnetic-field generator 119. When a coil current is applied to the first magnetic-field generator 117 so as to flow in an appropriate direction through the exciting coils 117a, 117b, one of the first linear portions 121a is magnetized to the S pole (or the N pole) while the other linear portion 121b is magnetized to the N pole (or the S pole). Similarly, when a coil current is applied to the second magnetic-field generator 119 so as to flow in an appropriate direction through the exciting coils 119a, 119b, one of the linear portions 123a is magnetized to the S pole (or the N pole) while the other linear portion 123b is magnetized to the N pole (or the S pole). Thus, the first and second magnetic-field generators 117, 119 produce respective magnetic fields normally intersecting each other. The instant apparatus has drive circuits (not shown) for applying coil currents to the first and second generators 117, 119, respectively.

When coil currents are applied to the first and second magnetic-field generators 117, 119 with a plasma arc being ejected from the nozzle 62 of the plasma torch 16, the two magnetic fields produced by the two generators 117, 119 normally intersect the plasma arc before the plasma arc is emitted from the nozzle 62 and thereby deflects the plasma arc to a direction H by an angle $\theta s$ with respect to the vertical axis L, as shown in FIG. 11. The direction H to which the plasma arc is deflected can be changed freely in the instant embodiment, as described below.

Referring to FIG. 13 there is illustrated a graph whose X and Y axes correspond to the directions X and Y indicated in FIG. 12, respectively, and the origin of the graph corresponds to the center line of the nozzle 62.

The two magnetic fields produced by the first and second magnetic-field generators 117, 119 are represented by respective magnetic-field vectors, and a single composite magnetic-field vector GM is derived from the two magnetic-field vectors. If an appropriate composite vector GM is determined as described below, an appropriate magnetic-field vector GMX to be produced by the first generator 117 is determined by the formula, $GMX = GM\cos\theta$, while an appropriate magnetic-field vector GMY to be produced by the second generator 119 is determined by the formula, $GMY = GM\sin\theta$. The coil currents applied to the first and second generators 117, 119 are determined based on the magnitudes of the vectors GMX, GMY, respectively. In addition, the direction of each of the coil currents applied to the first and second generators 117, 119 is determined based on the direction of the composite magnetic-field vector GM, namely, direction of a corresponding one of the vectors GMX, GMY. When the composite vector GM is applied to the plasma arc, an electric current flowing from a workpiece 6 toward an electrode 60 of the plasma torch 16, a Lorentz force acts on the plasma arc in a left-hand direction as viewed in the direction of the vector GM, in a vertical plane normal to the direction of the vector GM, so that the plasma arc is deflected by an angle $\theta s$ with respect to the vertical axis L as previously described. Thus, by adjusting the direction and magnitude of each of the magnetic-field vectors GMX, GMY produced by the first and second generators 117, 119, the plasma arc can be deflected to all directions in the range of 360 degrees with respect to the center line of the nozzle 62 (i.e., the vertical axis L).

The instant plasma-arc cutting apparatus employs a table representative of a predetermined relationship between composite vector magnitude and workpiece thickness, in place of the third table (see FIG. 6) used in the preceding embodiment. This table is provided for each of the pre-selected workpiece materials. Furthermore, the plasma-arc deflection control programs of the instant apparatus include programs for determining the direction and magnitude of the magnetic-field vector produced by each of the first and second generators 117, 119, namely, the magnitude and direction of the coil current applied to each of the first and second generators 117, 119.

The instant plasma-arc cutting apparatus operates for cutting the workpiece 6, according to a flow chart similar to the flow chart (see FIG. 5) used in the preceding embodiment, except that in Step 4 the magnitude of the composite magnetic-field vector GM is determined in the instant embodiment, that Step S5 is skipped, and that in Step S13 the magnitude and direction of the coil current applied to each of the first and second generators 117, 119 are determined based on the magnitude of the composite vector GM determined in Step S4 and the direction D of movement from a current position of the plasma torch 16 determined in Step S10. Thus, the plasma arc is always deflected by the composite magnetic field (GM) to an optimum direction with respect to the torch movement direction D as the plasma torch 16 is moved along a predetermined cutting path relative to the workpiece 6. As a result, a desired part 6A cut from the workpiece 6 has a high quality cut surface 7 normal to the upper and/or lower surfaces of the workpiece 6 (the desired part 6A). The instant embodiment is adapted such that the direction H to which the plasma arc is deflected corresponds to a right-hand direction as viewed in the direction D, similar to the preceding embodiment. The magnitude and direction of the coil current applied to each of the first and second generators 117, 119 are adjusted so that the plasma arc is always deflected to an optimum direction with respect to a direction D of movement of the plasma torch 16 from a current position thereof along the predetermined cutting path.

The instant plasma-arc cutting apparatus does not require rotating means (33, 35, 61) for rotating the magnetic-field generating device 110 or the plasma torch 16 about the center line of the plasma torch 16, unlike the preceding embodiment. This is an advantage of the instant embodiment. The instant embodiment has another advantage that, since rotating the plasma torch 16 is not required, it is possible to simplify the connection mechanism for connecting the gas supply and the coolant supply to the plasma torch 16.

While the instant embodiment employs the two magnetic-field generators 117, 119 producing the respective magnetic fields normally intersecting each other, it is possible to use more than two magnetic-field generators forming respective magnetic fields intersecting each other and control these generators so as to appropriately change the direction of a composite magnetic field resulting from the respective magnetic fields according to the direction D of movement of the plasma torch 16.

While the present invention has been described in its presently preferred embodiments with detailed particularities, it is to be understood that the present invention may be embodied with various changes, modifications and improvements that may occur to those skilled in the art without departing from the spirit and scope of the invention as defined in the appended claims.

What is claimed is:

1. A plasma-arc cutting apparatus comprising:
   a plasma torch producing a plasma arch for cutting a workpiece and including a nozzle from which said plasma arc is ejected toward said workpiece;
   feed means for moving said plasma torch relative to said workpiece;
   magnetic-field means for producing a magnetic field, and applying said magnetic field to said plasma arc so as to intersect said plasma arc and thereby deflect said plasma arc;
   first control means for numerically controlling said feed means according to cutting operation information including cutting path data representative of a predetermined curved cutting path along which said plasma torch is moved over said workpiece, said first control means providing torch position data representative of a current position of said plasma torch relative to said workpiece; and
   second control means for controlling said magnetic-field means according to said cutting operation information and said torch position data so that said plasma arc is deflected by said magnetic field in an optimum direction with respect to a direction of movement of said plasma torch from said current position along said curved cutting path, said optimum direction of deflection of said plasma arc by said magnetic field being constant with respect to said direction of movement of said plasma torch, despite a change in said direction of movement along said curved cutting path.

2. A plasma-arc cutting apparatus as set forth in claim 1, wherein said magnetic-field means comprises a plurality of magnetic-field generators producing respective magnetic fields intersecting each other, said second control means controlling at least strengths of said magnetic fields.

3. A plasma-arc cutting apparatus as set forth in claim 2, wherein said second control means further controls directions of said magnetic fields.

4. A plasma-arc cutting apparatus as set forth in claim 2, wherein said magnetic-field means comprises two magnetic-field generators producing respective magnetic fields perpendicularly intersecting each other, said magnetic-field generators applying said magnetic fields to said plasma arc such that each of said magnetic fields perpendicularly intersects said plasma arc.

5. A plasma-arc cutting apparatus as set forth in claim 1, wherein said magnetic-field means comprises:
a magnetic-path member having a curved configuration, and a pair of end portions opposed to each other between which said plasma arc passes; and
an exciting coil wound around said magnetic-path member, for magnetizing said magnetic-path member and thereby producing said magnetic field between said pair of end portions.

6. A plasma-arc cutting apparatus as set forth in claim 5, wherein said magnetic-path member includes a pair of arms and a connection portion connecting respective base portions of said arms to each other, said exciting coil being wound around said connection portion.

7. A plasma-arc cutting apparatus as set forth in claim 5, wherein said magnetic-path member includes two linear portions whose respective one ends are opposed to each other in a direction perpendicular to a center line of said nozzle, and a connection portion extending along an arc whose center is located on said center line of said nozzle, said connecting portion connecting the respective other ends of said linear portions to each other which ends are remote from said nozzle, said exciting coil comprising two coils wound around the corresponding linear portions in a same direction of winding.

8. A plasma-arc cutting apparatus as set forth in claim 5, wherein said nozzle is formed of a non-magnetic material, the non-magnetic nozzle being disposed between the opposed end portions of said magnetic-path member, said magnetic-field means applying said magnetic field to said plasma arc before said plasma arc is ejected from said non-magnetic nozzle.

9. A plasma-arc cutting apparatus as set forth in claim 5, further comprising:
third control means for controlling a magnitude of a plasma-arc current applied to said plasma torch, depending upon at least one of a material and a thickness of said workpiece,
said second control means including excitation control means for controlling a magnitude of a coil current applied to said exciting coil depending upon said at least one of said material and said thickness of said workpiece.

10. A plasma-arc cutting apparatus as set forth in claim 9, wherein said excitation control means comprises a table representative of a predetermined relationship between said coil current and said at least one of said material and said thickness of said workpiece, and controls said coil current according to said table.

11. A plasma-arc cutting apparatus as set forth in claim 1, further comprising
select means for selectively designating, in the event that said workpiece is cut along a closed cutting path, a clockwise and a counterclockwise direction in which direction said plasma torch is moved along said closed cutting path for cutting said workpiece,
said cutting operation information including cutting direction data representative of the designated clockwise or counterclockwise direction.

12. A plasma-arc cutting apparatus comprising:
a rotatable plasma torch producing a plasma arc for cutting a workpiece and including a nozzle from which said plasma arc is ejected toward said workpiece;
means for supporting said rotatable plasma torch rotatably about a center line of said nozzle;
feed means for moving said plasma torch relative to a said workpiece;
magnetic-field means for producing a magnetic field, and applying said magnetic field to said plasma arc so as to intersect said plasma arc and thereby deflect said plasma arc, said magnetic-field means being fixed to said plasma torch so that magnetic-field means is rotated with said plasma torch;
rotating means for rotating said plasma torch and said magnetic-field means about said center line, to thereby change a direction of said magnetic field produced by said magnetic-field means;
first control means for numerically controlling said feed means according to cutting operation information including cutting path data representative of a predetermined curved cutting path along which said plasma torch is moved over said workpiece, said first control means providing torch position data representative of a current position of said plasma torch relative to said workpiece; and
second control means for controlling said rotating means to rotate said magnetic-field means together with said plasma torch, according to said cutting operation information and said torch position data so that the direction of said magnetic field is controlled to hold a direction of deflection of said plasma arc constant with respect to a direction of movement of said plasma torch from said current position along said curved cutting path, despite a change in said direction of movement along said curved cutting path.

13. A plasma-arc cutting apparatus comprising:
a non-rotatable plasma torch producing a plasma arc for cutting a workpiece and including a nozzle from which said plasma arc is ejected toward said workpiece;
feed means for moving said plasma torch relative to said workpiece;
magnetic-field means for producing a magnetic field, and applying said magnetic field to said plasma arc so as to intersect said plasma arc and thereby deflect said plasma arc, said magnetic-field means being rotatable to said plasma torch, about a center line of said nozzle;

rotating means for rotating said magnetic-field means relative to said plasma torch;

first control means for numerically controlling said feed means according to cutting operation information including cutting path data representative of a predetermined curved cutting path along which said plasma torch is moved over said workpiece, said first control means providing torch position data representative of a current position of said plasma torch relative to said workpiece; and second control means for controlling said rotating means to rotate said magnetic-field means relative to said plasma torch, according to said cutting operation information and said torch position data so that the direction of said magnetic field is controlled to hold a direction of deflection of said plasma arc constant with respect to a direction of movement of said plasma torch from said current position along said curved cutting path, despite a change in said direction of movement along said curved cutting path.

* * * * *